Nov. 3, 1931.  F. KOHL  1,830,470

CLOTHESLINE SUPPORTER

Original Filed Aug. 4, 1925

INVENTOR
Frank Kohl
BY Wm Bodge
ATTORNEY

Patented Nov. 3, 1931

1,830,470

UNITED STATES PATENT OFFICE

FRANK KOHL, OF HOBOKEN, NEW JERSEY

CLOTHESLINE SUPPORTER

Application filed August 4, 1925, Serial No. 48,076. Renewed August 28, 1931.

The present invention relates to improvements in clothes line supporters in which the line is arranged to run in folded relation over a pair of spaced pulleys or grooved sheave wheels, the invention being more particularly directed to means for adjustably securing the ends of the line with respect to each other.

A further object of the invention is to provide means whereby the tension on the line at one end automatically serves to hold or lock the opposite end of the same.

Also to provide means for readily increasing, decreasing and entirely releasing the tension of the line.

For further comprehension of the invention, and of the objects and advantages thereof, reference is had to the following description and accompanying drawings, and to the appended claims in which the various features of the invention are more particularly pointed out.

Figure 1:
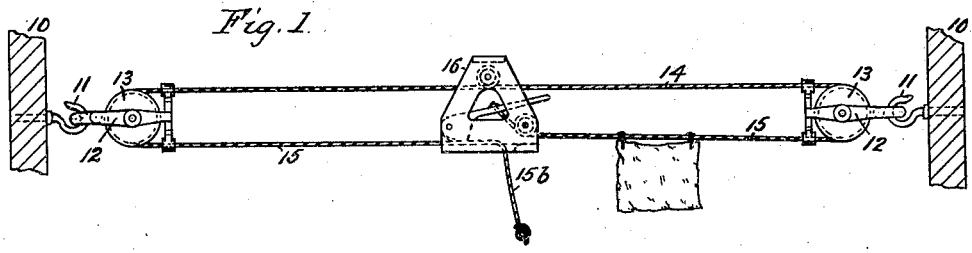
Figures 2, 3:
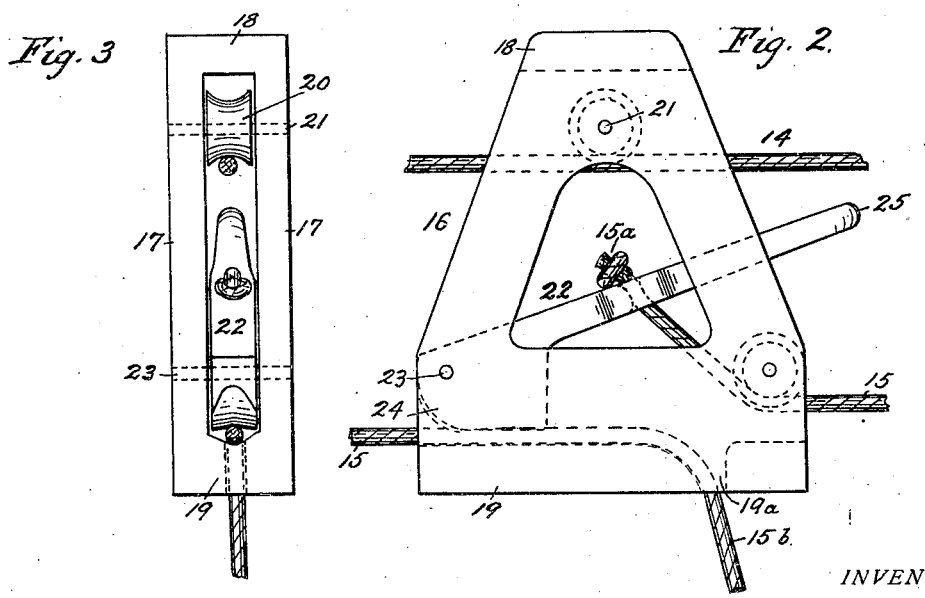

In the drawings Figure 1 is a side elevational view showing in operative position the device embodied in the present invention. Figure 2 is an enlarged view of the frame or carriage supported by the line and arranged to lock the opposite ends of the line together. Figure 3 is an edge view of the frame taken at right angle to Fig. 2.

In Figure 1 of the drawings, numerals 10 indicate a pair of oppositely fixed conventional supports and may comprise the commonly employed walls of opposite buildings, or poles, one thereof being adjacent a window or other opening through which the line may be readily operated in the usual manner for hanging out or removing the clothes to be dried.

Secured to the supports 10 are hooks 11, carrying the blocks 12, in which are mounted the usual grooved pulleys or sheave wheels 13, the latter being spaced apart and disposed to operatively support a movable clothes line folded over the wheels to form respectively the upper and lower sections 14 and 15, the latter including the ends of the line.

Carried by the line is a connection frame or carriage 16, comprising a pair of spaced side walls 17 connected together at top and bottom by the wall portions 18 and 18 respectively, the latter wall forming a clamping section for one end of the line. Between the side walls at the top of the frame is a grooved roller 20 rotatively mounted on the pin 21, fixed in the side walls, the roller being arranged to engage and be supported by the upper section 14 of the line. Also between the side walls 17 of the frame is a cam lever 22, pivotally supported by the pin 23 fixed in the frame. At its lower or pivotal end the lever is provided with a cam section 24, while its opposite or operating end is extended at 25 to form a handle for manually releasing the clamping action of the cam section. Between the ends of the lever 22, the end 15a of the lower line section 15 is secured by means of a knot as shown. The opposite or free end 15b of the lower line section is passed between the side walls 17 of the frame and between the bottom wall 19 of the latter and the cam section 24 of the lever 22, from this point the line passes downwardly through a perforation 19a in the bottom wall of the frame and is secured against displacement by a terminal knot as shown.

As thus arranged it will be evident that the end portion 15b of the lower line section will be held against movement by the clamping action of the cam 24 against the bottom wall or clamping section 19 of the frame, this clamping action being effected through the leverage afforded by the arm 22 and the tension exerted by the opposite end 15a of the line, and as the load upon the line increases a corresponding increase of tension is applied to the lever which likewise increases its clamping action and automatically serves to lock the ends of the line together and to the frame. By manually raising the free end 25 of the lever a small amount the clamping action of the cam will be released, and the desired tension of the line readily effected by manually grasping the free end 15b thereof. Furthermore, a pull on the free end of the line serves to measurably release the cam action and allows the slack in the main line to be taken up, and upon the release of said free end the clamping action of the cam automatically returns.

What I claim as my invention and desire to secure by Letters Patent, is:

1. In combination with a frame having line connections of the class described, of a lever pivotally mounted at one end in said frame and having a free opposite end, a cam section formed at the pivot end of said lever extending toward the free end thereof and co-operating with the bottom wall of said frame for adjustably clamping one end of the line, means for leading the free end of the latter through a perforation in said bottom wall of the frame in spaced relation to said cam section, and means for securing the opposite end of the line intermediate the ends of said lever.

2. In a line connecting device, a cam lever having a pivotal connection at one end and at its opposite end an operating handle, a line connection formed between the ends of said lever, and a cam section at the pivotal end of said lever extending outwardly therefrom toward said opposite end of the lever.

Signed at New York, in the county of New York and State of New York, this 1st day of August, A. D. 1925.

FRANK KOHL.